United States Patent
Lee et al.

(10) Patent No.: US 7,953,184 B2
(45) Date of Patent: May 31, 2011

(54) DIRECT SAMPLING TYPE WIRELESS RECEIVER AND METHOD USING THE SAME

(75) Inventors: Sang Yub Lee, Gyunggi-Do (KR); Chang Soo Yang Yang, Gyunggi-Do (KR); Wan Cheol Yang, Gyunggi-Do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 587 days.

(21) Appl. No.: 12/124,881

(22) Filed: May 21, 2008

(65) Prior Publication Data

US 2008/0292023 A1    Nov. 27, 2008

(30) Foreign Application Priority Data

May 22, 2007   (KR) ......................... 10-2007-0049833

(51) Int. Cl.
 *H04L 27/18* (2006.01)
 *H04L 27/22* (2006.01)
 *H04B 1/30* (2006.01)
(52) U.S. Cl. ........ 375/316; 375/326; 375/329; 455/324; 329/306
(58) Field of Classification Search .................. 375/316, 375/279–281, 329, 332, 326; 455/323, 324, 455/130; 329/304, 306, 307; 708/290
See application file for complete search history.

(56) References Cited

U.S. PATENT DOCUMENTS

| | | | |
|---|---|---|---|
| 4,841,544 A * | 6/1989 | Nuytkens | 375/150 |
| 5,692,014 A | 11/1997 | Basham et al. | |
| 5,937,013 A * | 8/1999 | Lam et al. | 375/340 |
| 7,302,024 B2 * | 11/2007 | Arambepola | 375/347 |
| 2007/0030931 A1 * | 2/2007 | Arambepola | 375/346 |
| 2009/0009155 A1 * | 1/2009 | Hosokawa et al. | 324/76.38 |

* cited by examiner

*Primary Examiner* — Tesfaldet Bocure
(74) *Attorney, Agent, or Firm* — Lowe, Hauptman, Ham & Berner, LLP

(57) ABSTRACT

There are provided a direct sampling type wireless receiver and a method using the same that reduce nonlinearity and DC offset by using a multi-port network and a carrier frequency direct conversion method with a low sampling rate of a direct sampling method in a wireless communication receiver. A direct sampling type wireless receiver according to an aspect of the invention includes: a reference signal generation unit supplying a first reference signal having a predetermined frequency and a second reference signal having a higher frequency than the first reference signal; a down sampling unit sampling an input RF signal according to the first reference signal; an analog-to-digital converting unit converting the signal sampled by the down sampling unit into a digital signal according to the second reference signal; and a multiple-input multiple-output port unit dividing the digital signal from the analog-to-digital converting unit into a plurality of digital signals, generating a plurality of carrier signals having different phases from each other by shifting phases of the digital signals, and outputting a plurality of phase signals having different phases from each other by adding the plurality of carrier signals and the plurality of digital signals to each other.

17 Claims, 4 Drawing Sheets

DIRECT SAMPLING TYPE WIRELESS RECEIVER AND METHOD USING THE SAME

CROSS-REFERENCE TO RELATED APPLICATIONS

This application claims the priority of Korean Patent Application No. 2007-0049833 filed on May 22, 2007, in the Korean Intellectual Property Office, the disclosure of which is incorporated herein by reference.

BACKGROUND OF THE INVENTION

1. Field of the Invention

The present invention relates to a wireless receiver and a method using the same, and more particularly, to a direct sampling type wireless receiver and a method using the same that reduce nonlinearity and DC offset by using a multi-port network and a carrier frequency direct conversion method with a low sampling rate of a direct sampling method in a wireless communications receiver.

2. Description of the Related Art

Recently, with the technological development of wireless communication, various types of wireless communication technologies have been developed.

In general, the wireless communication technologies perform down conversion of RF (radio frequency) signals into IF (intermediate frequency) signals and convert the IF signals into baseband signals to restore information contained in original signals and use the restored information.

The above-described wireless communication technologies require many RF devices to perform IF down conversion and baseband conversion and need to convert both characteristics and structures of the RF devices when changing a system. Therefore, a carrier frequency direct conversion method that does not use IF down conversion has been used.

The carrier frequency direct conversion method can be easily used to change the system. However, DC offset caused by direct conversion or phase mismatch between I/Q signals may occur to cause deterioration in performance. Further, in order to convert the entire circuit used in the carrier frequency direct conversion method into a digital system, analog signals need to be converted into digital signals by using a sampling frequency that is generally equal to or higher than twice the carrier frequency.

When a usable frequency band reaches several GHz, in order to perform an analog to digital conversion operation with the high frequency that is higher than twice the carrier frequency, an apparatus that has a high sampling rate needs to be used. Since such an apparatus requires high resolution computing, the cost and volume of the apparatus increase. Therefore, it may be impossible to apply the above apparatus to the wireless communication device that is being reduced in weight, thickness, and size.

Therefore, in order to solve the above-described problems, there is a need for a wireless communication device using a new sampling method.

SUMMARY OF THE INVENTION

An aspect of the present invention provides a direct sampling type wireless receiver and a method using the same that reduce nonlinearity and DC offset by using a multi-port network and a carrier frequency direct conversion method with a low sampling rate of a direct sampling method in a wireless communication receiver.

According to another aspect of the present invention, there is provided a direct sampling type wireless receiver including: a reference signal generation unit supplying a first reference signal having a predetermined frequency and a second reference signal having a higher frequency than the first reference signal; a down sampling unit sampling an input RF signal according to the first reference signal; an analog-to-digital converting unit converting the signal sampled by the down sampling unit into a digital signal according to the second reference signal; and a multiple-input multiple-output port unit dividing the digital signal from the analog-to-digital converting unit into a plurality of digital signals, generating a plurality of carrier signals having different phases from each other by shifting phases of the digital signals, and outputting a plurality of phase signals having different phases from each other by adding the plurality of carrier signals and the plurality of digital signals to each other.

The first reference signal may have a frequency determined according to a frequency bandwidth of the RF signal.

The first reference signal may have a predetermined frequency set according to the following Equation, $$\frac{2}{n} f_H \le f_S \le \frac{2}{n-1}(f_H - B),\qquad \text{Equation}$$

where $B = f_H - f_L$, B is the frequency bandwidth of the RF signal, $F_H$ is a high frequency at a frequency band, $f_L$ is a low frequency at the frequency band, n is a positive number less than or equal to $$\frac{f_H}{B},$$

and $f_s$ is the frequency of the first reference signal.

The second reference signal may have a frequency higher than twice the frequency of the first reference signal.

The reference signal generation unit may include: an oscillator generating the first reference signal; and a frequency multiplier multiplying the frequency of the first reference signal from the oscillator to generate the second reference signal.

The multiple-input multiple-output port may include: a sine wave generator generating a sine wave signal according to the phase of the digital signal from the analog-to-digital converting unit; a divider dividing the digital signal into the plurality of digital signals; a phase shifter shifting a phase of the sine wave signal to generate the plurality of carrier signals having different phases from each other; and an adder group including a plurality of adders individually adding the plurality of digital signals from the divider and the plurality of carrier signals from the phase shifter to each other.

The direct sampling type wireless receiver may further include an operation unit operating the magnitude of each of the plurality of phase signals from the multiple-input multiple-output port unit.

The direct sampling type wireless receiver may further include: an I/Q signal generation unit generating an I signal and a Q signal having different magnitudes by separating the I/Q signals from each other on the basis of the magnitude of each of the plurality of phase signals.

The operation unit may include: a squarer squaring the magnitude of each of the plurality of phase signals from the multiple-input multiple-output port unit; and filters each removing harmonic components in each of the plurality of phase signals squared by the squarer.

The multiple-input multiple-output port unit, the operation unit, and the I/Q signal generation unit may constitute an SDR (Software Defined Radio) system formed of software in at least one programmable IC.

According to another aspect of the present invention, there is provided a direct sampling type wireless receiving method including: sampling an input RF signal according to a first reference signal having a predetermined frequency; converting the sampled signal into a digital signal according to a second reference signal having a higher frequency than the first reference signal; and dividing the digital signal into a plurality of digital signals, shifting phases of the digital signals to generate a plurality of carrier signals having different phases from each other, and adding the plurality of carrier signals and the plurality of digital signals to each other to form a plurality of phase signals having different phases from each other.

Each of the first and second reference signals may have a frequency determined according to a frequency bandwidth of the RF signal.

The first reference signal may have a predetermined frequency set by the following Equation, $$\frac{2}{n}f_H \le f_S \le \frac{2}{n-1}(f_H - B) \ldots,,$$ Equation where $B=f_H-f_L$, B is a frequency bandwidth of the RF signal, $f_H$ is a high frequency at a frequency band, $f_L$ is a low frequency at the frequency band, n is a positive number less than or equal to $$\frac{f_H}{B},$$

and $f_s$ is the frequency of the first reference signal.

The second reference signal may have a frequency higher than twice the frequency of the first reference signal.

The direct sampling type wireless receiving method may further include operating the magnitude of each of the plurality of phase signals.

The direct sampling type wireless receiving method may further include generating an I signal and a Q signal having different magnitudes by separating the I/Q signals from each other on the basis of the magnitude of each of the plurality of phase signals.

The operating the magnitude of each of the plurality of phase signals may include: squaring the magnitude of each of the phase signals; and removing harmonic components in each of the squared phase signals.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings.

Figure 1:
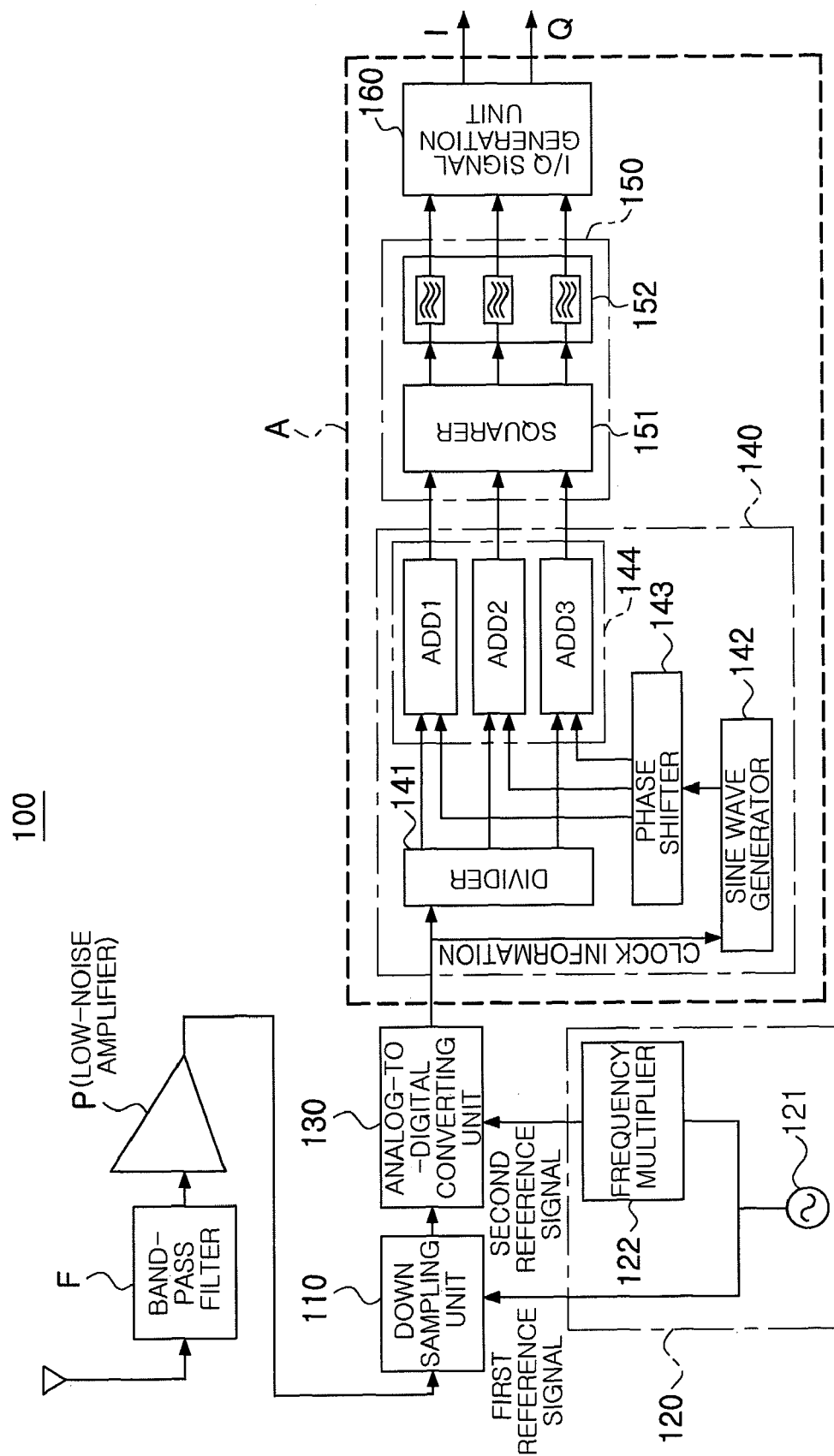
FIG. 1 is a view illustrating a configuration of a wireless receiver according to an exemplary embodiment of the present invention.

FIG. 1 is a view illustrating a configuration of a wireless receiver according to an exemplary embodiment of the invention.

Referring to FIG. 1, a wireless receiver 100 according to an exemplary embodiment of the invention includes a down sampling unit 110, a reference signal generation unit 120, an analog-to-digital converting unit 130, and a multiple-input multiple-output port unit 140.

The down sampling unit 110 performs a sampling operation of an RF signal according to a first reference signal that has a predetermined frequency. The RF signal received from an antenna may be band-pass filtered with a predetermined bandwidth and then low-noise amplified. Therefore, a band-pass filter F and a low-noise amplifier P may be further included at a front stage of the down sampling unit 110. The down sampling unit 110 may be formed of a switch that switches the RF signal according to the first reference signal and performs the sampling operation of the RF signal. As described above, the frequency of the RF signal is downsampled with the sampling frequency close to the frequency of the original signal included in the RF signal without conversion into an intermediate frequency signal.

The reference signal generation unit 120 generates the first reference signal that has the predetermined frequency and a second reference signal that has a higher frequency than the first reference signal. The second reference signal needs to have a frequency higher than twice the frequency of the first reference signal to satisfy Nyquist theorem. The reference signal generation unit 120 may include an oscillator 121 that supplies the first reference signal and a frequency multiplier 122 that multiplies the frequency of the first reference signal supplied from the oscillator 121.

The second reference signal is transmitted to the analog-to-digital converting unit 130.

The analog-to-digital converting unit 130 converts the signal sampled by the down sampling unit 110 into a digital signal according to the second reference signal. The converted digital signal is transmitted to the multiple-input multiple-output port unit 140.

The multiple-input multiple-output port unit 140 receives the digital signal from the analog-to-digital converting unit 130, divides the digital signal into a plurality of digital signals, and adds the plurality of digital signals to a plurality of carrier signals obtained by shifting a phase of sine wave generated according to clock information included in the digital signals from the analog-digital converting unit 130.

The multiple-input multiple-output port unit 140 may include a divider 141, a sine wave generator 142, a phase shifter 143, and an adder group 144. The divider 141 divides the digital signal into a plurality of digital signals. The sine wave generator 142 generates a sine wave according to the digital signal. The phase shifter 143 generates a plurality of carrier signals obtained by shifting a phase of the sine wave from the sine wave generator 142. The adder group 144 includes a plurality of adders that individually adds the plurality of signals and the plurality of carrier signals to each other.

The wireless receiver 100 according to the embodiment of the invention may further include an operation unit 150 and an I/Q signal generation unit 160.

The operation unit 150 operates the plurality of phase signals from the multiple-input multiple-output port unit 140. The operation unit 150 may include a squarer 151 that squares the magnitude of each of the plurality of phase signals. The operation unit 150 may further include filters 152 each of which removes harmonic components in each of the squared phase signals that may occur due to the squarer 151.

The plurality of phase signals from which the harmonic components are removed by using the filters 152 are transmitted to I/Q signal generation unit 160. The I/Q signal generation unit 160 separates an I signal and a Q signal on the basis of changes in phase of the plurality of phase signals.

The multiple-input multiple-output port unit 140, the operation unit 150, and the I/Q signal generation unit 160 may constitute an SDR (Software Defined Radio) system formed of software in at least one programmable IC. Therefore, the embodiment of the invention can be applied to various wireless communication systems by controlling the sine wave of the sine wave generator and the phase of the phase shifter through programming according to different RF signals. Further, as described above, the signals can be controlled through programming, which facilitates maintenance and modification in design.

Figure 2:
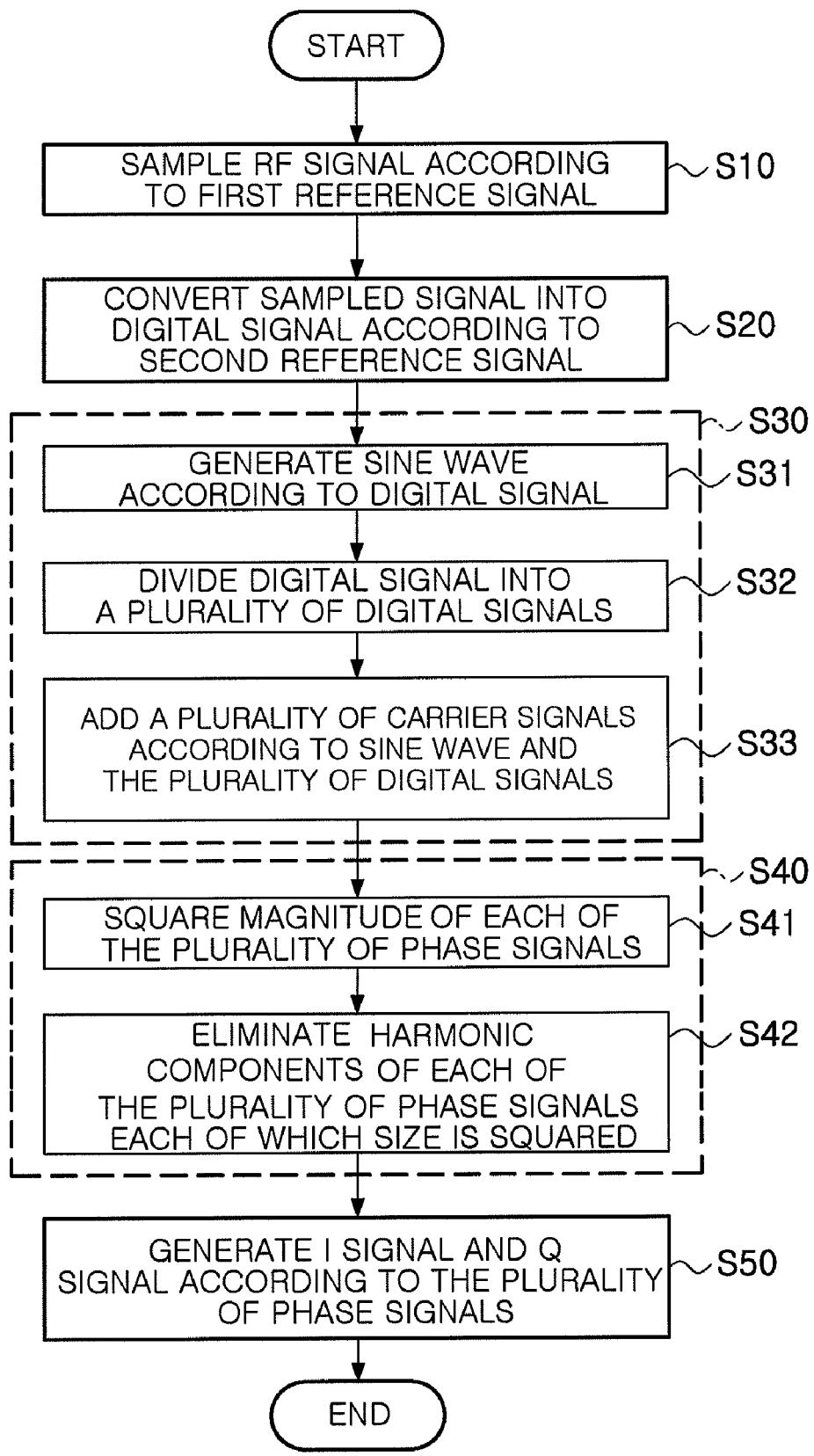
FIG. 2 is a flowchart illustrating a wireless receiving method according to another exemplary embodiment of the present invention.

FIG. 2 is a flowchart illustrating a wireless receiving method according to another exemplary embodiment of the present invention.

Referring to FIG. 2, a wireless receiving method according to another exemplary embodiment of the invention will be described.

Figure 3A:
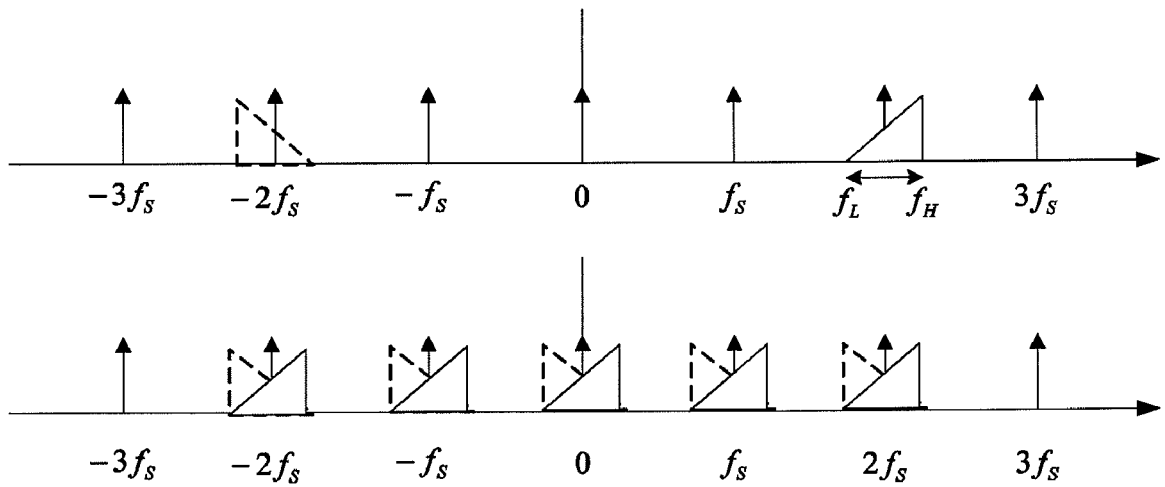
FIG. 3A is a down sampling graph of the wireless receiver.
Figure 3B:
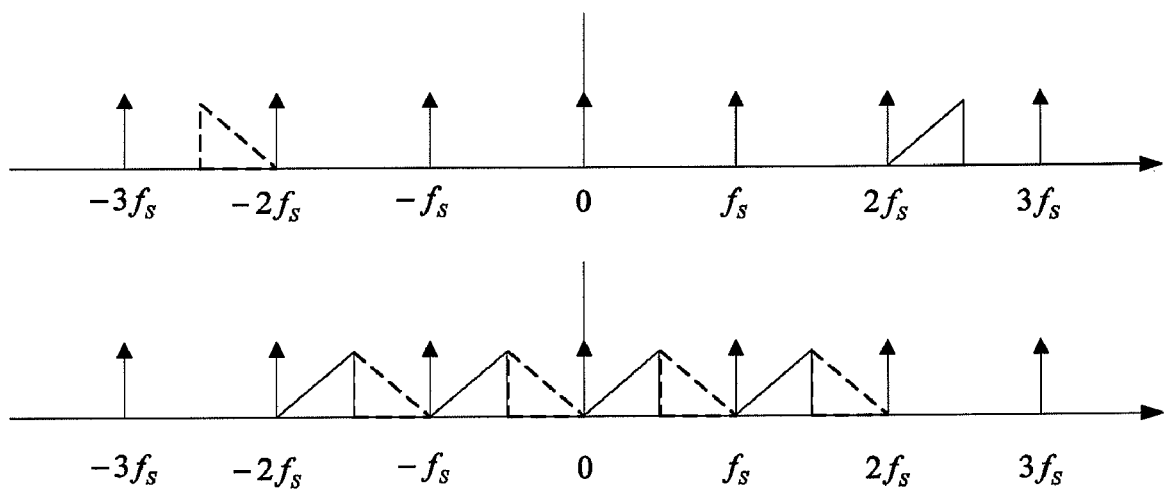
FIG. 3B is a down sampling graph of the wireless receiver.

FIGS. 3A and 3B are sampling graphs illustrating the wireless receiver.

FIG. 3A is a sampling graph in which aliasing occurs during a sampling operation of the wireless receiver. FIG. 3B is a sampling graph in which aliasing is removed by setting a sampling frequency according to predetermined Equation during the sampling operation of the wireless receiver.

Figure 4A:
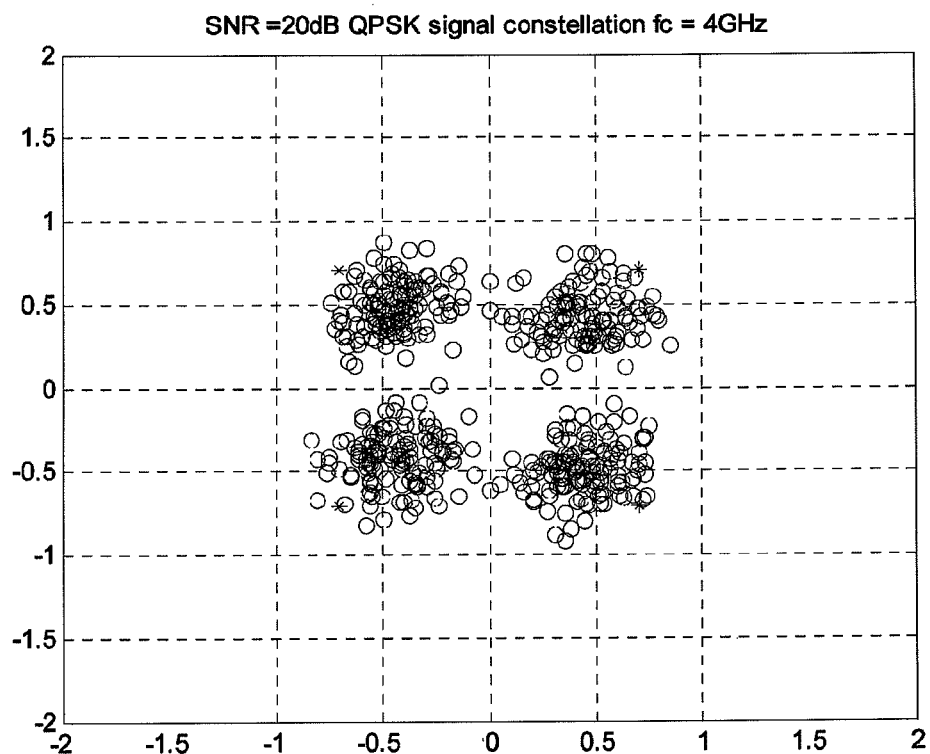
FIG. 4A is a constellation diagram of an I signal and a Q signal of a wireless receiver.
Figure 4B:
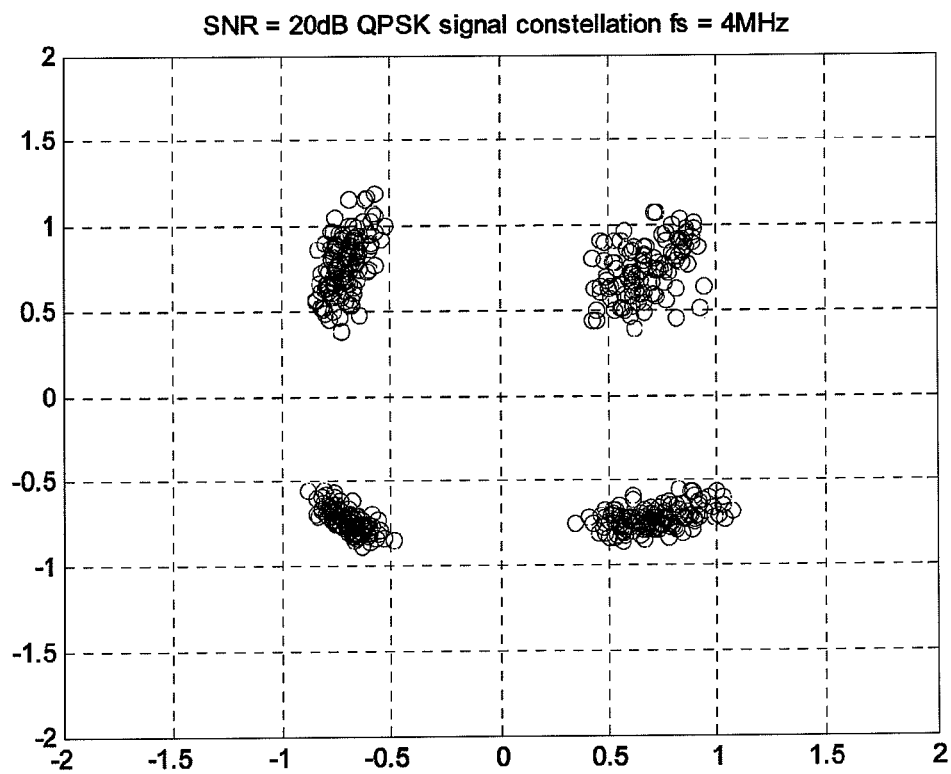
FIG. 4B is a constellation diagram of an I signal and a Q signal of a wireless receiver.

FIGS. 4A and 4B are constellation diagrams of an I signal and a Q signal of the wireless receiver.

FIG. 4A is a constellation diagram of the I signal and the Q signal when a general multiple-input multiple-output port unit including IF band and its components is used in a wires communication receiver performing conversion into intermediate frequency signals. FIG. 4B is a constellation diagram of the I signal and the Q signal separated from each other by using a down sampling method and a multiple-input multiple-output port unit as in the wireless receiver according to the exemplary embodiment of the invention.

Hereinafter, the operation and effect of the invention will be described in detail with the accompanying drawings.

Referring to FIGS. 1 to 4, first, an RF signal is input through an antenna. Band-pass filtering and low-noise amplification may be performed on the RF signal. After preprocessing the RF signal as above-described, the RF signal is transmitted to the down sampling unit 110. The down sampling unit 110 performs a sampling operation of the RF signal according to a first reference signal that has a predetermined frequency (S10).

Here, the frequency of the first reference signal may be determined by the following Equation.

$$\frac{2}{n} f_H \le f_S \le \frac{2}{n-1}(f_H - B),$$ Equation where $B=f_H-f_L$, B is a frequency bandwidth of the RF signal, $f_H$ is a high frequency at a frequency band, $f_L$ is a low frequency at the frequency band, n is a positive number less than or equal to $$\frac{f_H}{B},$$

and $f_s$ is a frequency of the first reference signal.

The reason the frequency is determined by using the above-described Equation is that aliasing may occur when the sampling frequency band is set. That is, as shown in FIG. 3A, the sampled signals overlap with each other, and thus aliasing may occur.

The frequency that is determined by the above-described Equation is set to be twice as high as the usable frequency band of the RF signal, but not to be twice as high as the frequency of the RF signal. Therefore, it is possible to sample the RF signal at a lower sampling rate as compared when the RF signal is sampled at a frequency twice as high as the frequency of the RF signal. This allows easier circuit design and lower power consumption.

Then, the analog-to-digital converting unit 130 converts the signal sampled by the down sampling unit 110 into a digital signal according to a second reference signal. Here, a frequency of the second reference signal needs to be higher than twice the frequency of the first reference signal in order to accurately restore the original signal according to Nyquist theorem (S20).

Then, the digital signal from the analog-to-digital converting unit 130 is transmitted to the multiple-input multiple-output port unit 140, and the multiple-input multiple-output port unit 140 generates a plurality of phase signals according to the digital signal. (S30)

More specifically, the digital signal is divided into a plurality of digital signals by the divider 141, and a sine wave having a phase is generated by the sine wave generator 142 according to the digital signal (S31 and S32). The phase of the sine wave is shifted by the phase shifter 143, the phase-shifted sine wave is converted into a plurality of carrier signals having different phases from each other, and the plurality of carrier signals and the plurality of digital signals are added by adders ADD1, ADD2, and ADD3 of the adder group 144 to output a plurality of phase signals (S33).

Then, the plurality of phase signals are transmitted to the operation unit 150, which operates the phase signals (S40). More specifically, the plurality of phase signals are transmitted to the squarer 151, the magnitude of each of the phase signals is squared by the squarer 151 (S41), and the noise is removed from each of the squared phase signals by using each of the filters 152 (S42).

Finally, the plurality of phase signals passing through the operation unit 150 are transmitted to the I/Q signal generation unit 160, and the I/Q signal generation unit 160 generates an I signal and a Q signal on the basis of the phases of the plurality of phase signals (S50).

More specifically, the I/Q signal generation unit 160 calculates initial parameters used to regenerate the I/Q signals on the basis of changes in phase of the plurality of phase signals, corrects phases of the initial I/Q regeneration parameters to normalize the corrected I/Q generation parameters, and finally generates the I signal and the Q signal.

Constellation diagrams of the generated I signal and Q signal will be illustrated as shown in FIGS. 4A and 4B.

Referring to FIG. 4A, the constellation diagram of the I signal and the Q signal in the wireless receiver to which the down sampling unit according to the exemplary embodiment of the invention is not applied is shown. As shown in FIG. 4A, in the wireless receiver to which the down sampling unit according to the exemplary embodiment of the invention is not applied, since the frequency of the carrier signal is set to be higher than that of the RF signal, it is difficult to demodulate the carrier signals. As a result, it is difficult to separate the I signal and the Q signal from each other. In order to separate the I and Q signals from each other, there is a need for higher-order filters.

On the other hand, referring to FIG. 4B, the constellation diagram of the I signal and the Q signal in the wireless receiver according to the exemplary embodiment of the invention is shown. Referring to FIG. 4B, since the down sampling unit according to the exemplary embodiment of the invention performs a sampling operation according to a reference signal in portion to a usable frequency band of the RF signal, it is possible to use the carrier signal having a relatively low frequency. Therefore, it is easier to demodulate the carrier signal, and it is easy to separate the I signal and the Q signal from each other.

As set forth above, according to the exemplary embodiments of the invention, the wireless receiver samples the RF signal on the basis of the reference signal in proportion to a frequency band of the received RF signal to thereby reduce a sampling rate, and uses the multiple-input multiple-output port unit to reduce power consumption and realize broadband characteristics. Further, since almost all parts of the receiver are embodied by software, it is easier to cope with a change in characteristics of the RF signal, allow easier circuit design, and reduce the product size.

While the present invention has been shown and described in connection with the exemplary embodiments, it will be apparent to those skilled in the art that modifications and variations can be made without departing from the spirit and scope of the invention as defined by the appended claims.

What is claimed is:

1. A direct sampling type wireless receiver comprising:
   a reference signal generation unit supplying a first reference signal having a predetermined frequency and a second reference signal having a higher frequency than the first reference signal;
   a down sampling unit sampling an input RF signal according to the first reference signal;
   an analog-to-digital converting unit converting the signal sampled by the down sampling unit into a digital signal according to the second reference signal; and
   a multiple-input multiple-output port unit dividing the digital signal from the analog-to-digital converting unit into a plurality of digital signals, generating a plurality of carrier signals having different phases from each other by shifting phases of the digital signals, and outputting a plurality of phase signals having different phases from each other by adding the plurality of carrier signals and the plurality of digital signals to each other.

2. The direct sampling type wireless receiver of claim 1, wherein the first reference signal has a frequency determined according to a frequency bandwidth of the RF signal.

3. The direct sampling type wireless receiver of claim 2, wherein the first reference signal has a predetermined frequency set according to the following Equation, $$\frac{2}{n}f_H \le f_S \le \frac{2}{n-1}(f_H - B),\quad \text{Equation}$$

where $B=f_H-f_L$, B is the frequency bandwidth of the RF signal, $f_H$ is a high frequency at a frequency band, $f_L$ is a low frequency at the frequency band, n is a positive number less than or equal to $$\frac{f_H}{B},$$

and $f_s$ is the frequency of the first reference signal.

4. The direct sampling type wireless receiver of claim 3, wherein the second reference signal has a frequency higher than twice the frequency of the first reference signal.

5. The direct sampling type wireless receiver of claim 1, wherein the reference signal generation unit comprises:
   an oscillator generating the first reference signal; and
   a frequency multiplier multiplying the frequency of the first reference signal from the oscillator to generate the second reference signal.

6. The direct sampling type wireless receiver of claim 1, wherein the multiple-input multiple-output comprises:
   a sine wave generator generating a sine wave signal according to the phase of the digital signal from the analog-to-digital converting unit;
   a divider dividing the digital signal into the plurality of digital signals;
   a phase shifter shifting a phase of the sine wave signal to generate the plurality of carrier signals having different phases from each other; and
   an adder group including a plurality of adders individually adding the plurality of digital signals from the divider and the plurality of carrier signals from the phase shifter to each other.

7. The direct sampling type wireless receiver of claim 1, further comprising an operation unit operating the magnitude of each of the plurality of phase signals from the multiple-input multiple-output port unit.

8. The direct sampling type wireless receiver of claim 7, further comprising:
   an I/Q signal generation unit generating an I signal and a Q signal having different magnitudes by separating the I/Q signals from each other on the basis of the magnitude of each of the plurality of phase signals.

9. The direct sampling type wireless receiver of claim 7, wherein the operation unit comprises:
   a squarer squaring the magnitude of each of the plurality of phase signals from the multiple-input multiple-output port unit; and
   filters each removing harmonic components in each of the plurality of phase signals squared by the squarer.

10. The direct sampling type wireless receiver of claim 8, wherein the multiple-input multiple-output port unit, the operation unit, and the I/Q signal generation unit constitute an SDR (Software Defined Radio) system formed of software in at least one programmable IC.

11. A direct sampling type wireless receiving method comprising:
   sampling an input RF signal according to a first reference signal having a predetermined frequency;
   converting the sampled signal into a digital signal according to a second reference signal having a higher frequency than the first reference signal; and dividing the digital signal into a plurality of digital signals, shifting phases of the digital signals to generate a plurality of carrier signals having different phases from each other, and adding the plurality of carrier signals and the plurality of digital signals to each other to form a plurality of phase signals having different phases from each other.

12. The direct sampling type wireless receiving method of claim 11, wherein each of the first and second reference signals has a frequency determined according to a frequency bandwidth of the RF signal.

13. The direct sampling type wireless receiving method of claim 12, wherein the first reference signal has a predetermined frequency set by the following Equation, $$\frac{2}{n}f_H \leq f_S \leq \frac{2}{n-1}(f_H - B) \ldots ,,$$ Equation where $B=f_H-f_L$, B is a frequency bandwidth of the RF signal, $f_H$ is a high frequency at a frequency band, $f_L$ is a low frequency at the frequency band, n is a positive number less than or equal to $$\frac{f_H}{B},$$

and $f_s$ is the frequency of the first reference signal.

14. The direct sampling type wireless receiving method of claim 11, wherein the second reference signal has a frequency higher than twice the frequency of the first reference signal.

15. The direct sampling type wireless receiving method of claim 11, further comprising operating the magnitude of each of the plurality of phase signals.

16. The direct sampling type wireless receiving method of claim 15, further comprising generating an I signal and a Q signal on the basis of the magnitude of each of the plurality of phase signals.

17. The direct sampling type wireless receiving method of claim 15, wherein the operating the magnitude of each of the plurality of phase signals comprises:
    squaring the magnitude of each of the phase signals; and
    removing harmonic components in each of the squared phase signals.

* * * * *